US007357983B2

(12) United States Patent
Pfefferle et al.

(10) Patent No.: US 7,357,983 B2
(45) Date of Patent: Apr. 15, 2008

(54) CONTROLLED GROWTH OF SINGLE-WALL CARBON NANOTUBES

(75) Inventors: Lisa Pfefferle, Branford, CT (US); Gary Haller, New Haven, CT (US); Dragos Ciuparu, New Haven, CT (US)

(73) Assignee: Yale University, New Haven, CT (US)

( * ) Notice: Subject to any disclaimer, the term of this patent is extended or adjusted under 35 U.S.C. 154(b) by 730 days.

(21) Appl. No.: 10/328,857

(22) Filed: Dec. 18, 2002

(65) Prior Publication Data

US 2003/0148086 A1    Aug. 7, 2003

Related U.S. Application Data

(60) Provisional application No. 60/341,773, filed on Dec. 18, 2001.

(51) Int. Cl.
    *B82B 1/00* (2006.01)
(52) U.S. Cl. .................. 428/367; 977/843; 423/447.3; 428/368
(58) Field of Classification Search ............. 423/447.3; 428/367, 368; 977/843
    See application file for complete search history.

(56) References Cited

U.S. PATENT DOCUMENTS

| | | | |
|---|---|---|---|
| 5,538,711 | A | 7/1996 | Emerson et al. |
| 6,314,019 | B1 | 11/2001 | Kuekes et al. |
| 6,333,016 | B1 | 12/2001 | Resasco et al. |
| 6,413,487 | B1 | 7/2002 | Resasco et al. |
| 6,896,864 | B2 * | 5/2005 | Clarke ..................... 423/447.1 |

FOREIGN PATENT DOCUMENTS

| | | |
|---|---|---|
| JP | 2002-255519 | 9/2002 |
| WO | WO-97/32571 | 9/1997 |
| WO | WO-00/73205 A1 | 12/2000 |
| WO | WO-01/16155 A1 | 3/2001 |

OTHER PUBLICATIONS

Alvarez et al., "Synergism of Co and Mo in the catalytic production of single-wall carbon nanotubes by decomposition of CO." *Carbon*, 39(4):547-558, 2001.
Chueng et al., "Diameter-controlled Synthesis of Carbon Nanotubes." *Journal of Physical Chemistry B*, 106:2429-2433, 2002.
Cui et al., "Nanowire Nanosensor for Highly Sensitive and Selective Detection of Biological and Chemical Species," *Science*, 293:1289-1292, 2001.
Dai, H., "Carbon nanotubes: opportunities and challenges." *Surface Science*, 500:218-241, 2002.
Duxiao, J., et al., "Catalytic growth of carbon nanotubes from the internal surface of Fe-loading mesoporous molecular sieves materials." *Mat. Chem. & Physics*, 69(1-3):246-251, 2001.
Fonseca, A., et al., "Synthesis of multi-wall carbon nanotubes over supported catalysts." *Appl.Phys. A*, 67: 11-22, 1998.
Kataura, H., et al., "Optical Properties of Single-Wall Nanotubes." *Synthetic Metals* 103: 2555-2558, 1999.
Lanois, P., et al., "Carbon nanotubes synthesized in channels of AlPO4-5 single crystals: first X-ray scattering investigation." *Solid State Commun.* 116: 99-103, 2000.
Lee, J., et al., "Synthesis of a new mesoporous carbon and its application to electrochemical double-layer capacitors." *Chem. Commun.*, 1999, 2177-2178.
Li, W.Z., et al., "Large-Scale Synthesis of Aligned Carbon Nanotubes." *Science*, 5293: 1701-1703, 1996.
Lim, S. et al., "Gas phase methanol oxidation on V-MCM-41." *Applied Catalysis A*, 188: 277-286, 1999.
Lim, S. et al., "Preparation of highly ordered vanadium-substituted MCM-41: stability and acidic properties." *J. Phys. Chem. B*, 106: 8437-8448, 2002.
Mukhopadhyay, K. et al., "A simple and novel way to synthesize aligned nanotube bundles at low temperature." *Jpn. J. Appl. Phys.*, 37: L1257-L1259, 1998.
Rao, C.N.R. et al., "Nanotubes." *CHEMPHYSCHEM* 2: 78-105, 2001.
Ravikovitch, P.I. et al., "Evaluation of pore structure parameters of MCM-41 catalyst supports and catalysts by means of nitrogen and argon adsorption," *J. Phys. Chem. B* 101: 3671-3679, 1997.
Sinott, S.B. et al., "Model of carbon nanotube growth through chemical vapor deposition." *Chem. Phys. Lett.* 315: 25-30, 1999.
Wang, X. et al., "Two- and three-dimensional alignment and patterning of carbon nanotubes." *Adv. Mater.*, 14: 165-167, 2002.
Wu, C.-G. et al., "Conducting carbon wires in ordered nanometer-sized channels." *Science*, 266:1013-1015, 1994.
Zhang, A. et al., "A novel method of varying the diameter of carbon nanotubes formed on an Fe-supported Y zeolites catalyst." *Microporous and Mesoporous Materials*, 29: 383-388, 1999.
Zhang, A. et al., "Template synthesis of high-density carbon nanotube arrays." *J. Cryst. Growth*, 223: 306-310, 2001.
Zhao, X.S., et al., "Advances in mesoporous molecular sieve MCM-41." *Ind. Eng. Chem. Res.* 35: 2075-2090, 1996.
Yang et al., "Multivariate correlation and prediction of the synthesis of vanadium substituted mesoporous molecular sieves," *Microporous and Mesoporous Materials*, 67:245-257, (2004).
Oye et al., "A multivariate analysis of the synthesis conditions of mesoporous materials," *Microporous and Mesoporous*, 34:291-299, (2000).
Lim et al., "Synthesis and Characterization of Highly Ordered Co-MCM-41 for Production of Aligned Single Walled Carbon Nanotubes (SWNT)," J. Phys. Chem. B, 107:11048-11056, (2003).
Jun Li et al., "The Synthesis of Single-Walled Carbon Nanotubes by CVD Catalyzed with Mesoporous MCM-41 Powder" by "Science and Application of Nanotubes", Tomanek & Enbody, Kluwer Academic/Plenum, p. 181-193 (2000).
He et. al., "Growth of carbon nanotubules on Fe-loading zeolites and investigation of catalytic active center," *Materials Science and Engineering C*, 8-9:151-157 (1999).

* cited by examiner

Primary Examiner—Stuart Hendrickson
(74) Attorney, Agent, or Firm—Drinker Biddle & Reath

(57) ABSTRACT

A transition metal substituted, amorphous mesoporous silica framework with a high degree of structural order and a narrow pore diameter distribution (±0.15 nm FWHM) was synthesized and used for the templated growth of single walled carbon nanotubes (SWNT). The physical properties of the SWNT (diameter, diameter distribution, electronic characteristic) can be controlled by the template pore size and the pore wall chemistry. The SWNT can find applications, for example, in chemical sensors and nanoscale electronic devices, such as transistors and crossbar switches.

49 Claims, 6 Drawing Sheets

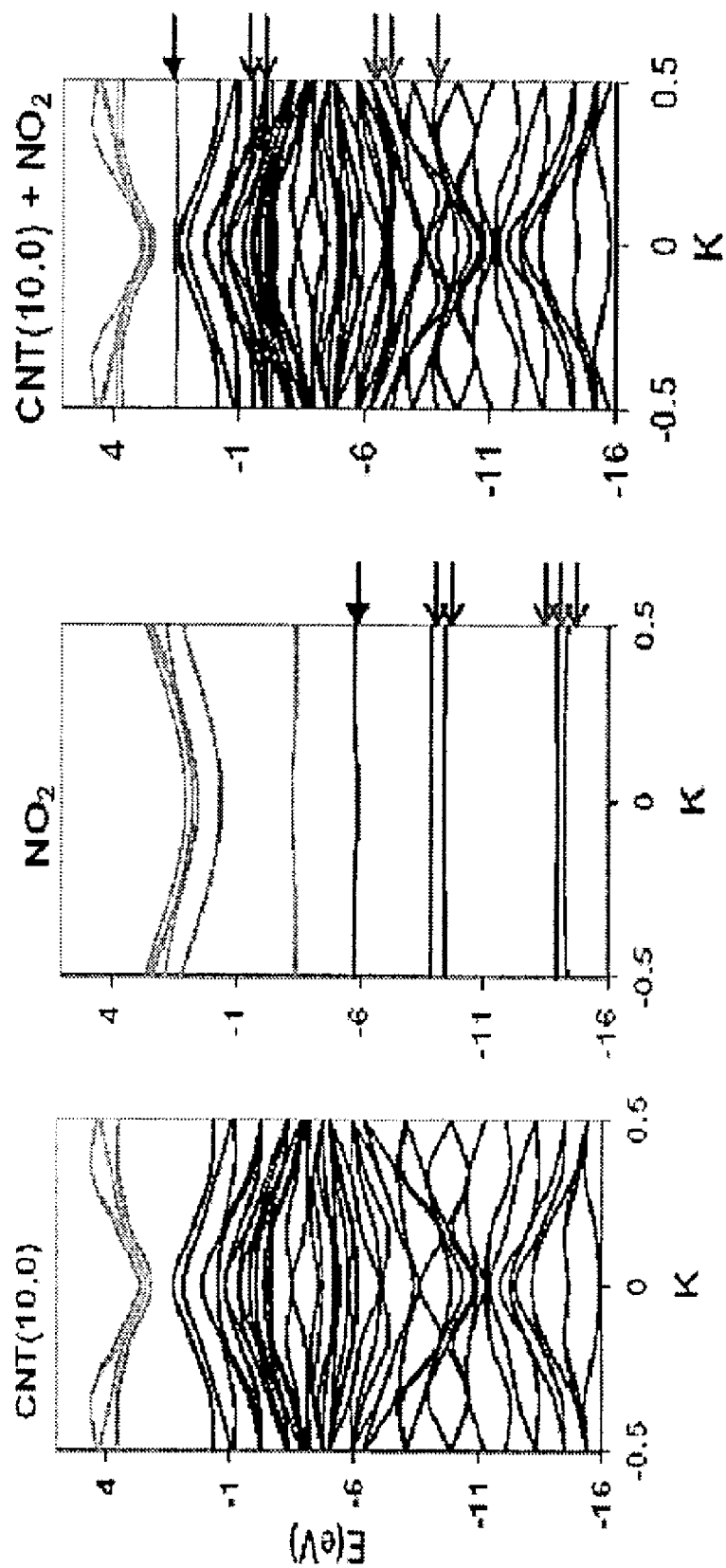

CONTROLLED GROWTH OF SINGLE-WALL CARBON NANOTUBES

CROSS-REFERENCE TO OTHER PATENT APPLICATIONS

This application claims the benefit of U.S. provisional Patent Application No. 60/341,773, filed Dec. 18, 2001, the subject matter of which is incorporated herein by reference in its entirety.

BACKGROUND OF THE INVENTION

Carbon nanotubes are seamless tubes of graphite sheets and can be either multi-walled (MWNT) or single-walled (SWNT). Generally, carbon SWNT are preferred over carbon MWNT's because SWNT have fewer defects and are stronger and are better electrical conductors than MWNT's of similar diameter. The structure of the SWNT is defined by how the graphite sheet is aligned in a rolled up configuration. Carbon nanotubes exhibit technologically important electronic properties and have shown promising applications, including nanoscale electronic devices, high strength materials, electron field emission devices, tips for scanning probe microscopy, and chemical sensors. Most electronic applications of carbon nanotubes require significant amounts of aligned SWNT that are reasonably homogeneous in diameter, length and helicity, since the electronic properties correlate both with the diameter and chirality (twist). Carbon nanotubes can be found in both metallic and semiconducting structures. Metallic nanotubes can carry large current densities while semiconducting nanotubes can be electrically switched on and off like field-effect transistors (FET's).

Various approaches for synthesizing carbon nanotubes are described, for example, in U.S. Pat. No. 6,333,016 which is incorporated herein by reference.

Single-walled carbon nanotubes are typically prepared in the presence of a particulate transition metal catalyst, such as V or Co. However, SWNT prepared using the particulate catalysts show a rather broad distribution of SWNT diameters, with the width of the distribution increasing with the SWNT diameter. Catalysts, in particular metal catalysts, tend to restructure and sinter under the harsh reaction conditions required for SWNT synthesis, leading to the formation of multi-faceted crystals, with each facet potentially initiating the growth of a SWNT and contributing to the heterogeneity in diameter and structure.

As a result, no economically scalable methods exist for reliably preparing, separating or aligning nanotubes of controlled diameter and electronic properties either by selective synthesis or through post-synthesis separation. The inability to make controlled junctions on the nanoscale is also a limiting factor in making particular electronic devices requiring local gate layout. Device development therefore is limited by the lack of control in synthesizing clean aligned nanotubes of a specified type. The inability to make controlled junctions on a nanometer scale is also a limiting factor in making particular electronic devices requiring local gate layout.

It would therefore be desirable to develop a material system and a process for the growth of carbon SWNT with better defined chemical and physical properties. It would also be desirable to produce nanoscale devices that incorporate such SWNT for electronic and sensing applications.

SUMMARY OF THE INVENTION

The invention, in one aspect, is directed to the growth of carbon SWNT with controllable physical properties, such as a predetermined diameter and a narrow diameter distribution, in a catalytic template or catalytic framework. The prepared SWNT can have well-defined electric and/or magnetic characteristics and/or a selective response to the presence of foreign molecules.

According to one aspect of the invention, a method for producing single-wall carbon nanotubes includes providing a framework made of an mesoporous siliceous structure having a predetermined uniform pore size and containing a metal ions located only in substitutional sites of the framework, with the dispersed metal ions forming the only source of catalytic sites, and flowing a carbon-containing reactant over the framework at a predetermined temperature. The method produces single-wall carbon nanotubes with a diameter that correlates with the predetermined pore size.

According to another aspect of the invention, an ordered arrangement of nanotubes with a narrow diameter distribution includes a framework made of an mesoporous siliceous structure having a predetermined uniform pore size and containing metal ions selectively dispersed in substitutional sites of the framework, wherein the dispersed metal ions form the only source of the catalytic sites. The single-wall carbon nanotubes disposed in the pores of the framework have a diameter that correlates with the predetermined pore size.

According to yet another aspect of the invention, a chemical sensor includes single-wall carbon nanotubes with a narrow diameter distribution. The sensor is composed of a framework made of an mesoporous siliceous structure having a predetermined uniform pore size and containing metal ions selectively dispersed in substitutional sites of the framework, wherein the dispersed metal ions form the only source of the catalytic sites. The single-wall carbon nanotubes disposed in the pores of the framework have at least one open end and a diameter that correlates with the predetermined pore size. The open end can be functionalized with a receptor site adapted to selectively bind with a target ligand.

According to yet another aspect of the invention, an electronic switching device, such as a transistor, in particular a field-effect transistor (FET), and/or a crossbar switch, includes a framework made of an mesoporous siliceous structure having interconnecting pores of a predetermined uniform pore size and containing metal ions selectively dispersed in substitutional sites of the framework, wherein the dispersed metal ions form the only source of the catalytic sites. Single-wall carbon nanotubes are disposed in the interconnecting pores and have a predetermined electronic characteristic and a diameter that correlates with the predetermined pore size. Electrical contacts are disposed on the nanotubes for enabling an electric current flow along a longitudinal direction of the nanotubes, and a gate contact is disposed between the electrical contacts for controlling the electric current flow.

Advantageously, the gate contact can be formed by a nanotube disposed in the interconnecting pores of the framework so as to contact the nanotube through which the electric current flows.

Advantageous embodiments of the invention can include one or more of the following features. The mesoporic siliceous framework can include Mobil M41S class materials, such as MCM-41 and/or MCM-48. A framework with a predetermined pore size can be produced by adding a surfactant with a predetermined alkyl chain length to a solution containing silica and the metal ions, wherein the predetermined pore size correlates with the alkyl chain length. A framework with pore sizes ranging between approximately 1.5 and 20 nm can be designed, with pore sizes between 1.5 and 4 nm being of particular interest for the growth of SWNT.

The surfactant can include $C_nH_{2n+1}(CH_3)_3NBr$ with n=10, 12, 14, and 16, whereby the structural properties of the framework can be further improved by adding an antifoaming agent to the solution. The metal ions can be selected from the first row of transitional metals, particularly from the group consisting of Ti, V, Cr, Mn, Fe, Co, and Ni. The metal ion concentration in the substitutional sites of the framework can be adjusted independently of the pore size. This allows the electronic characteristic to be defined as a function of the pore size and the concentration of the metal ions. The electronic characteristic can be metallic, semimetallic or semiconducting.

The reactant for growing the carbon nanotubes contains carbon and can include carbon monoxide (CO) and/or acetylene, and may in addition include a reducing agent, such as ammonia and/or hydrogen. In one embodiment, the framework can be exposed to an organic molecule which absorbs on the framework wall. The organic molecule can advantageously include a material with a C5 or C6 ring structure, such as phenol, benzoic acid or benzyl chloride.

The structural characteristic of the framework is improved by using HiSil-915 as the silica starting material and maintaining a pH value of approximately 11 during the formation of the framework.

The nanotubes produced with the aforedescribed method can have at least one open end, which can be functionalized with a receptor site adapted to selectively bind with a target ligand. The target ligand can be an inorganic molecule and/or an organic molecule. For example, the receptor site can be biotin and the target ligand monoclonal antibiotin.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIG. 5A illustrates the electronic band structure of a SWNT(10,0);

FIG. 5B illustrates the energy levels a $NO_2$ molecule;

FIG. 5C illustrates the electronic band structure of the $NO_2$ molecule attached to the SWNT;

DETAILED DESCRIPTION OF CERTAIN ILLUSTRATED EMBODIMENTS

Figure 1:
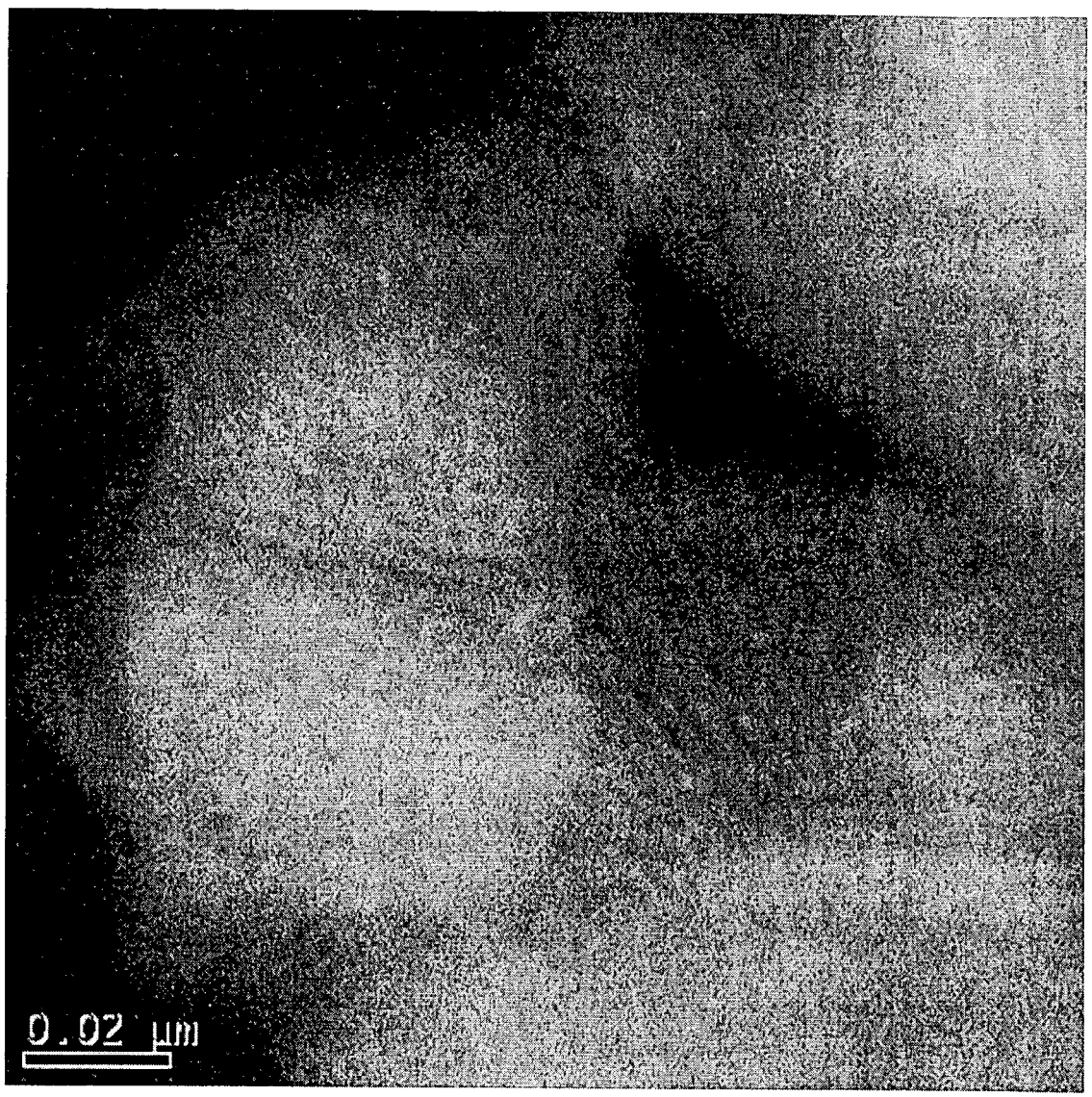
FIG. 1 is a dark-field transmission electron microscopic (TEM) image of an unpurified Co-MCM-41 sample after 4 hours exposure to pure CO at 750° C.

The invention, among other things, includes a method and system for the preparation of mesoporous molecular sieve (MPMS) catalytic templates with a defined uniform pore size and chemical composition and for growing carbon single-wall nanotubes (SWNT) in the pores of the catalytic templates. The prepared SWNT can have well-defined electric and/or magnetic characteristics and/or a selective response to the presence of foreign molecules.

It is a realization of the inventors that a template material for the growth of SWNT should preferably allow control of both composition and channel (or pore) size because, if they can be varied independently, selective growth of specific forms of metallic or semiconducting SWNT can be expected. The term composition refers here generally to the chemical composition, such as the concentration of metal ions in the template, in particular near or at the exposed pore walls. Mesoporous materials of the Mobil M41S class (MCM-41 and MCM-48) with metal ions suitably incorporated in the framework as the source for the catalytic sites can provide the desired control of SWNT growth.

According to the IUPAC definition, mesoporous materials are referred to as materials having pores sizes in a range between about 2.0 nm and 20 nm, now extended to 1.5 to 20 nm. Unlike zeolites which are crystalline materials so that their pore size cannot be varied separately of the composition, the M41S class mesoporous materials (MCM-41 and MCM-48) developed by Mobil Oil Corporation has a structured pore arrangement with pore diameters ranging from 1.5-4 nm wherein the pore walls are amorphous. The pore structure and pore size can be produced independent of the substitution of transition metal ions in the framework (for dilute substitutions). A uniform pore distribution and pore size (~0.1 nm FWHM uniformity in the pore diameter) can be achieved through careful control of the growth process, which will be described below. Both the chemical composition and the pore diameter have been found to play a role in determining the structure of carbon nanotubes formed in the pores.

EXAMPLE

Synthesis of the Catalytic Framework

As catalytic framework for the controlled growth of nanotubes, M41S class catalytic templates, in particular MCM-41 and MCM-48, with Ti, V, Cr, Fe, Co, and Ni framework substitutions were synthesized with a well-defined uniform pore size between approximately 1.5-4 nm.

Silica sources were HiSil®-915 from Pittsburgh Plate Glass (PPG), and tetramethyl-ammonium silicate (10 wt % silica, SACHEM Inc.). HiSil® silicas are synthetic precipitated silica thixotropes used in a variety of coatings, resins, sealants and adhesive systems as rheology modifiers and as antisag/suspensions aids. The metal sources used were $CoSO_4.xH_2O$ (Aldrich Chemical Co.), $Fe(SO_4).7H_2O$ (Fisher Scientific Co.), $Fe(NO_3)_3.9H_2O$ (Sigma Co.), $Ni(NO_3)_2.6H_2O$ (Aldrich Chemical Co.), $Cr(NO_3)_3.9H_2O$ (Fisher Scientific Co.), and $VOSO_4.3H_2O$ (Aldrich Chemical Co.). Quatemary ammonium surfactants $C_nH_{2n+1}(CH_3)_3NBr$ were obtained from Sigma Co. with n=12, 14, 16 and from American Tokyo Kasei with n=10. The surfactant solutions were prepared by ion-exchanging a 29 wt % of $C_nH_{2n+1}(CH_3)_3NBr$ aqueous solution with equal molar exchange capacity of Amberjet-400 (OH) ion-exchange resin (Sigma Co.) by overnight batch mixing. The anti-foaming agent was Antifoam A from Sigma Co., a silane polymer alkyl terminated by methoxy groups. Acetic acid (Fisher Scientific) was used for pH adjustment of the synthesis solution. The pH was maintained at 11±0.1.

Aqueous solutions of HiSil-915, tetramethyl-ammonium silicate and the metal precursor (M=Ti, V, Cr, Fe, Co, and/or Ni) were mixed for 30 min with 50 ml of deionized water. The water-to-silicon ratio was varied from a $H_2O/Si$ mole ratio=74.4 to 86, based on the surfactant chain length. The surfactant solution was added to the prepared mixture of silica and metal and a small amount of anti-foaming agent (0.2 wt % of surfactant) was incorporated to remove excess foam produced by the surfactant. Acetic acid was added to maintain pH=11±0.1. The molar ratio of each component in the synthesis solution was controlled at $SiO_2$:surfactant:M:$H_2O$=1:0.27:0.017:X (X=74.4~86). After additional mixing for about 30 min, this synthesis solution was poured into a polypropylene bottle and placed in the autoclave at 100° C. for 6 days. After cooling to room temperature, the resulting solid was recovered by filtration, washed with deionized water and dried under ambient conditions. After drying, the solid was calcined by heating from room temperature to 540° C. for 20 hours in He, held for 1 hour at 540° C. in flowing He, and for 5 hours at 540° C. in flowing air to remove residual surfactant. A pure siliceous MCM-41 (without the addition of the metal salt to the synthesis solution) was also prepared with the same procedure as used for M-MCM-41.

Before the growth of the nanotubes, the resulting calcined solid is exposed to oxygen, heated to 850° C. and then cooled to the reaction temperature of 750° C., where it is maintained for an additional 15-30 minutes under an Ar atmosphere.

The resulting metal-substituted MCM-41 was found to have a parallel pore structure with hexagonal symmetry. The amorphous silica walls are less than 1 nm thick, as determined by X-ray diffraction at small angle.

The pore size was found to increase with increasing surfactant chain length regardless of the water content during synthesis. Conversely, the molar ratio of metal ions at the catalytic sites incorporated in the framework was found to increase with increasing water addition. Accordingly, the pore size, pore wall chemistry, and long-range structural order can be correlated reproducibly with individual synthesis parameters. The uniform pore size distribution can be controlled within ±0.1 nm FWHM by maintaining the pH level at, for example, pH=11±0.1 throughout the entire synthesis process. The addition of the antifoaming agent also improves the structural order of the framework.

In addition, the silica source of higher purity based on HiSil-915 (contains <0.5 wt. % $Na_2SO_4$) appears to aid in synthesis due the reduced particle size of the silicon source relative to the particle size achieved with the traditionally employed HiSil-233 starting material (which contains ~2.5 wt. % NaCl).

The following Table (Lim & Haller, J. Phys. Chem. B, vol. 106, p. 8437-8448, 2002) lists the pore diameters of V-MCM-41 prepared with different surfactant chain lengths (C12-C16) for HiSil-233. Also listed is the pore diameter of various V-MCM-41 catalytic templates prepared with a surfactant chain length C14 for HiSil-915 under pH control at pH=11, demonstrating the reproducibility of the pore size with better than ±0.1 nm FWHM.

| Surfactant chain length (Silica source) | Pore diameter (nm) |
| --- | --- |
| C10 (HiSil-233) | 1.82 |
| C12 (HiSil-233) | 2.07 |
| C12 (HiSil-233) | 2.07 |
| C12 (HiSil-233) | 2.08 |
| C14 (HiSil-233) | 2.19 |
| C16 (HiSil-233) | 2.59 |
| C14 (HiSil-915) | 2.48 |
| C14 (HiSil-915) | 2.36 |
| C14 (HiSil-915) | 2.43 |
| C14 (HiSil-915) | 2.49 |
| C14 (HiSil-915) | 2.44 |
| C14 (HiSil-915) | 2.44 |
| C14 (HiSil-915) | 2.46 |

The pore wall thickness was determined to be about 0.6-0.8 nm, with almost no change in the wall thickness for pore sizes in the range of 2-4 nm. The thin walls and the closely spaced (hexagonal) arrangement of the pores makes possible arrays with a high density of SWNT which has advantages for densely-packed electronic devices, chemical sensors and the like. The walls of the framework were found to be amorphous and are hence able to incorporate approximately 2 wt. % metal ions without affecting the wall structure. First row transition metal ions used in MCM-41 and MCM-48 synthesis replace $Si^{4+}$ isomorphously in a pseudo-tetrahedral coordination.

The thermal stability of these materials were tested by physisorption measurements and X-ray diffraction following repeated cycles in carbon deposition by CO disproportionation at 750° C. and carbon removal by temperature-programmed oxidation between room temperature and 900° C. under pure or helium-diluted oxygen. The pore size of all samples after these treatments were similar to that of the original MCM-41 sample.

Similar results were obtained with MCM-48 material which has an interconnecting pore structure. The pore diameter and the wall chemistry could be independently adjusted, as with MCM-41. With the possibility for controlling the physical and electronic properties of SWNT grown in the interconnected MCM-48 framework, electronic devices, such as crossbar switches and Y junction transistors, can be realized, as described below.

Synthesis of Nanotubes

The controlled pore size and wall chemistry of MPMS catalytic templates are relevant to the growth of carbon SWNT with controlled physical properties, such as nanotube diameter and helicity/electronic properties.

The SWNT may be in one practice produced in a tubular quartz chemical-vapor-deposition (CVD) reactor with 7 mm ID. The reactor is loaded with the catalytic template and placed in a furnace shell that allows both automatic and manual temperature control from room temperature to 1000° C. Pressure can also be varied and reactors can be operated up to 5 atmospheres. The reaction products are separated in a gas chromatograph (GC) equipped with a packed column, with CO and $CO_2$ converted into methane and detected in a Flame Ionization Detector. Organometallics in the reactant line are removed with a carbonyl trap and/or a trap to prevent metal ion particle deposition on the MCM catalytic template which tends to cause amorphous carbon deposits. Since the metal ions at the catalytic sites are already incorporated in the framework, the formation of carbon nanotubes in the template is not affected by the trap.

Exemplary carbon nanotubes were grown in a MCM-41 template prepared according to the method escribed above (with 2.8 nm pore diameter) using both pyrolysis of hydrocarbon precursors, such as acetylene, other organic molecule precursors (phenol) chemisorbed on the walls of the catalytic template, and CO disproportionation, which produced over 90% selectivity with high carbon yield filling the pores. Higher SWNT selectivity is obtained with CO disproportionation than with other carbon sources used. Alternatively, methane can be used to produce clean SWNT fibers, because it does not decompose easily.

SWNT were prepared as follows:

Example 1

After the aforedescribed preparation and pre-treatment of the model catalytic framework Co-MCM-41 and/or V-MCM-41, the catalytic framework is exposed to the reactant (pure CO) for 2-4 hours. The carbon deposited into the mesoporous molecular sieve (MCM-41) is then burned off with 4% oxygen in Argon at temperatures up to 900° C. and the cycle is repeated. Samples cycled three times typically contain SWNT with better than 90% selectivity with good filling of the pores. Thus pre-treatment conditions can be used to obtain high selectivity to SWNT inside of the pores. In particular, the Co-MCM-41 framework with 0.66 wt. % of cobalt and 2.8 nm pores produced nanotubes of predominantly metallic character and uniform diameter (as measured by the Raman breathing mode). The framework remained essentially unaffected by the repeated oxidation/reduction cycles.

Example 2

The catalytic ion framework is prepared and pretreated as described above. The reactant CO is fed simultaneously with a small amount 5-10% of ammonia, hydrogen or another reducing co-feed and exposed for 2-4 hours at 750° C. This process results in highly selective SWNT on the first cycle, but the added reducing agent can damage the catalytic template.

Example 3

The framework is prepared and pretreated as described above. In this example, the reactant is acetylene. The framework is exposed to the reactant in a diluent for 5-60 minutes at 750° C., thereby filling the pores of the framework with SWNT carbon nanotubes. Growth with acetylene is fast ($3.5*10^{-5}$ m/s) as compared to other techniques that use CO as the reactant. Since SWNT bundles can grow on the outside of the framework as a result of the fast reaction, control of SWNT growth inside of the pores is best achieved with a pulsed reaction feed, which also tends to prevent fouling of the framework with undesirable forms of carbon.

Example 4

Hydroxyl groups at the surface of the pores in MCM-41 materials can be used to attach organic molecules capable of carbon nanotube formation. For example, benzoic acid or phenol can react with surface hydroxyl to eliminate a water molecule and form ester- or ether-like chemical bonds with the surface silanol groups. Both metal-substituted frameworks and frameworks without substituted metal ions can be used. Solutions of the precursors (phenol, benzoic acid, etc) in different solvents (toluene, xylene, etc) are used to anchor the carbon precursor onto the internal surface of the catalytic template. The solid template is dispersed in the solution and heated into a beaker with a water cooler under strong stirring. As the temperature increases to the boiling temperature of the solvent the organic precursor will react with surface hydroxyls from the template to form ether- or ester-like compounds by eliminating a water molecule for each molecule of precursor anchored. The process temperature can be controlled by the choice of the solvent and the amount of precursor anchored onto the surface can be controlled by the concentration of the precursor in the initial solution and by the duration of the grafting process. After grafting, the template is removed from the solution by filtration, washed with solvent to remove precursor adsorbed on the outer surface and dried overnight under static atmosphere. The template grafted with organic carbon precursor is then heated at 10° C./min under inert (He, Ar or $N_2$) flow to 900° C. and then naturally cooled back to room temperature. Temperature programmed desorption showed phenol desorption peaks at 360 and 420° C. along with benzene giving evidence for species chemically bound to the surface and desorbing at temperature significantly higher than their boiling temperature (phenol boils at ~190° C.). Temperature programmed oxidation of the carbonaceous deposit obtained following the above-described procedure showed good selectivity (>95%) to a carbon species burning at 590° C.

The reactor is also equipped with analytic systems to study the nanotube synthesis both during and after growth. For example, an on-line mass spectrometer (MS) is used in transient reaction studies of small hydrocarbons and carbon oxides in the reaction effluent. The state of the metal ions at the catalytic sites in the template can be studied with UV-visible spectroscopy before and after reaction. The activation of the metal ions at the catalytic sites under different cycled conditions has been explored using XANES. In-situ XANES experiments can probe whether metal is extracted from the catalytic template. Other diagnostic tools include in-situ FTIR/Raman spectroscopy and UV-visible near IR spectroscopy. The in-situ FTIR/Raman spectroscopy is useful for observing changes in the reaction products over time. Samples have also been annealed at high temperatures under an inert carrier to examine restructuring.

Filling the pores with a single layer of carbon inside the pores, i.e., producing a SWNT, corresponds to a maximum weight increase of 15%. The SWNT produced were of high purity, largely metallic and of narrow diameter distribution as confirmed by Raman and UV-visible-near IR spectroscopy. Temperature programmed oxidation (calibrated with Raman spectroscopy) of the carbon deposited in these experiments demonstrated a high selectivity (>90%) for SWNT.

FIG. 1 shows a dark field TEM micrograph of a SWNT-containing Co-MCM-41 sample prepared according to Example 1 above. The parallel pore wall structure is visible in the center part of the image showing good stability of the template under SWNT synthesis conditions. Small gray dots in the center of the image suggest the presence of metallic particles of the order of less than 1 nm in size in the pore system of the Co-MCM-41 framework.

The lack of contrast between the silicon atoms in catalytic framework and the single layer of carbon forming the SWNT makes an exact determination of the SWNT size from the TEM micrograph difficult. The unfilled template pores are estimated to have a diameter of 2.8 nm. A carbon loading of 4.7 wt. % was determined from thermo-gravimetric and differential thermal analysis. The apparent pore size of the loaded pores as determined from TEM is 2.0 nm. This leave a spacing (gap) of approximately 0.3-0.4 nm between the SWNT wall and the interior wall of the unfilled pore. Alternatively, the SWNT diameter can also be determined, albeit indirectly, from optical measurements, such as the Raman spectroscopy.

Figure 2:
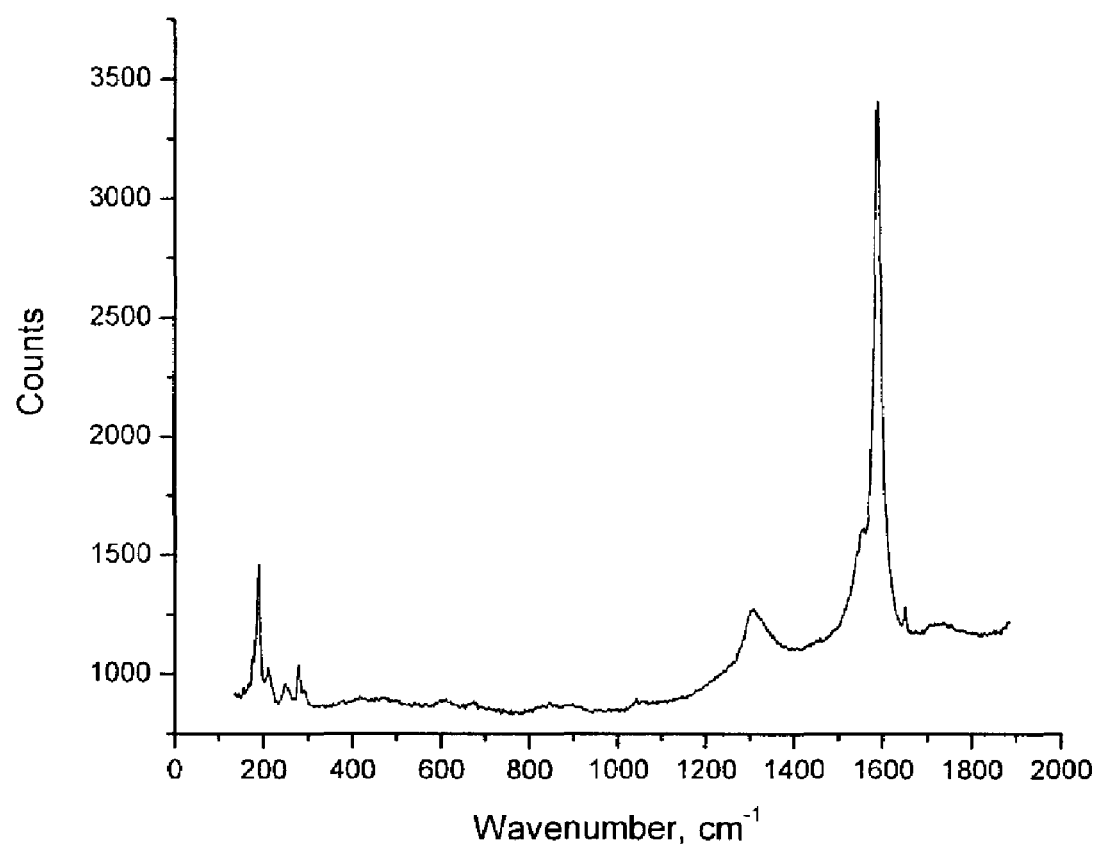
FIG. 2 shows a Raman spectrum recorded for an unpurified Co-MCM-41 sample after 4 hours exposure to pure CO at 750° C.

FIG. 2 shows a Raman spectrum excited at 514 nm of the unpurified Co-MCM-41 sample depicted in FIG. 1, i.e., after 4 hours exposure to pure CO at 750° C. The Raman measurement indicates an apparent SWNT diameter of 1.4 nm which is somewhat smaller than the diameter of 2.0 nm determined from TEM. This is due to the fact that the Raman breathing mode of the SWNT is affected by the confinement of the SWNT in the framework matrix. The SWNT diameter distribution is quite narrow, as indicated by the single peak in the Raman breathing mode. Analysis of the Raman spectra and the Van Hove transitions in the near-IR-UV-visible spectral range suggest that the SWNT produced are predominantly metallic.

Figure 3:
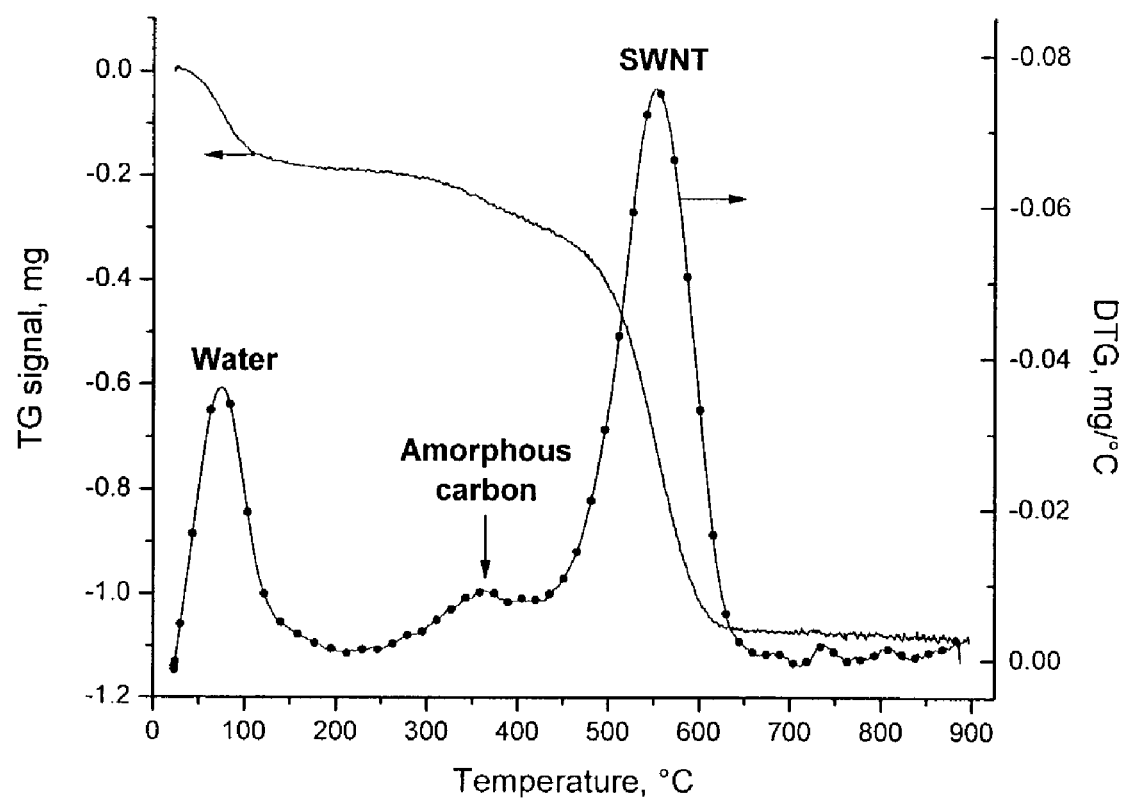
FIG. 3 shows a temperature programmed oxidation (TPO) profile for a Co-MCM-41 sample exposed 4 hours to pure CO at 750° C.

FIG. 3 shows a temperature programmed oxidation (TPO) profile to further illustrate the high selectivity to SWNT. The technique can be quantified using oxidation of known amounts of graphitic carbon and SWNT and is able to distinguish between amorphous carbon, MWNT and SWNT. Because the metal ions at the catalytic sites may change under reaction (and affect the TPO analysis/calibration), the TPO is calibrated periodically with Raman data and a reaction probe (CO oxidation). TPO experiments are carried out by flowing several percent of $O_2$ in He over the framework at various linear temperature ramps. Oxidation products (carbon oxides) are directly measured using an online mass spectrometer. TGA/DTA are also used as a sensitive probe of the amount of each type of carbon.

The experimental results further suggest that the produced carbon nanotubes are open-ended SWNT. For example, the samples with 2-3.5 wt. % carbon loading are whitish-grey and show a single peak in TPO. For circular pores with a diameter of 3 nm and 1 nm thick pore walls, and for a density of carbon and the Co-MCM-41 catalytic template of 2.2 g/cm$^3$, filling all the pores would result in an approximately 15% gain in weight of the catalytic framework. This result together with nitrogen physisorption experiments suggest that the SWNT are open-ended and reside inside the pores.

The exceptionally uniform pore size distribution of the catalytic template and the resulting size uniformity of the SWNT appears to be the result of the relative stability of the metal ions substituted in the framework. The metal ions initially incorporated in the silica framework are difficult to remove from the pore walls, preventing sintering of the catalytic sites and the formation of large metal particles even under multiple cycling (synthesis of SWNT followed by their oxidative removal) of the Co-MCM-41 under reaction conditions. The SWNT size is hence determined by the framework pore size and wall chemistry rather than by large metal particle clusters.

Carbon nanotubes have as "band structure", and can be metallic, semi-metallic and semiconducting. Metallic and semi-metallic nanotubes can carry large current densities; semiconducting nanotubes can be electrically switched on and off like field-effect transistors (FET). The physical and electronic structure of the SWNT is defined by the vector $R=m*a_1+n*a_2$ where n and m are integer constants that determine the diameter and chirality or "twist" of the nanotube. $a_1$ and $a_2$ are non-orthogonal unit vectors, with $a_1$ lying along a "zigzag" line in view of the atomic configuration along the circumference of the SWNT and $a_2$ being a reflection of $a_1$ over the armchair line. Three forms are defined: armchair (m, n=m), zigzag (m, n=0) and chiral (m, n). The diameter can be calculated if m, n and the C—C bond length are known.

For a graphene sheet, i.e. before the sheet is "rolled up" into a SWNT, the conduction and valence band touch each other at the six corner points of the first Brillouin zone. Since these states are filled up to the Fermi energy, the graphene sheet is semi-metallic with a zero bandgap. The electronic states of an infinitely long nanotube are continuous along the tube axis and quantized along the circumference. Carbon nanotubes are conductive when n-m is divisible by 3, i.e., the chirality or "twist" of the nanotube determines its conductivity. Since there are always states crossing the corner points of the first Brillouin zone, armchair tubes (m, 0) are always expected to be metallic. If |m−n|/3+0 mod(3), the electronic states miss the corner points and the nanotubes are semiconducting. The energy gap scales with the tube diameter as 1/d and is on the order of 0.5 eV for SWNT with a diameter of d=1.4 nm. Nanotubes where |m−n| is divisible by 3 become small bandgap semiconductors with a bandgap $E_g$ that scales with 1/d$^2$, with for example, $E_g$~10 meV for d~1.4 nm.

Control of the electronic properties of SWNT necessitates control of the chirality in addition to the nanotube diameter. The chirality appears to correlate with the wall chemistry, i.e., the concentration of catalytic sites in the pores. Lowering the concentration metal ions at the catalytic sites from above 0.5 wt. % to below approximately 0.1 wt. % is expected to shift the balance of produced SWNT from predominantly metallic to predominantly semiconducting. The achieved separate controllability of pore size and pore wall chemistry is hence an important feature for the preparation of SWNT with controllable electronic properties.

To test the conductivity and continuity of the SWNT in the pores, E-beam nano-contacts may be furnished at the ends of the nanotubes using SWNT-laden MCM particles. Electronic transport of carbon nanotubes has become a well-developed field, so that the electrical conductivity of nanotubes grown by the aforedescribed exemplary processes in M-MCM-41 catalytic templates can be easily compared with nanotubes grown by conventional methods. Top ohmic contacts prepared, for example, by e-beam lithography with various electrode configurations are used to assess the quality of the SWNT. Hall effect, capacitance-voltage (CV) and photoconductivity measurements also confirmed the metallic character of the SWNT inferred from optical measurements, as discussed above.

The experimental results suggest that carbon nanotubes can be grown with high selectivity for SWNT having a defined diameter with a narrow distribution by using a non-acidic M-MCM-41 template prepared from a HiSil-915 silica source. In the exemplary embodiments described herein, the SWNT tube diameter is correlated with the size of the catalytic template pore and the chemical environment of the wall which can be selected and controlled independently. Instead, the catalytically active component appears to be selectively dispersed at substitutional sites in the pore walls of the framework.

SWNT with controllable electronic and structural properties can find applications in various nanoscale electronic devices. Two possible exemplary devices will now be discussed.

Chemical Sensors

Figure 4:
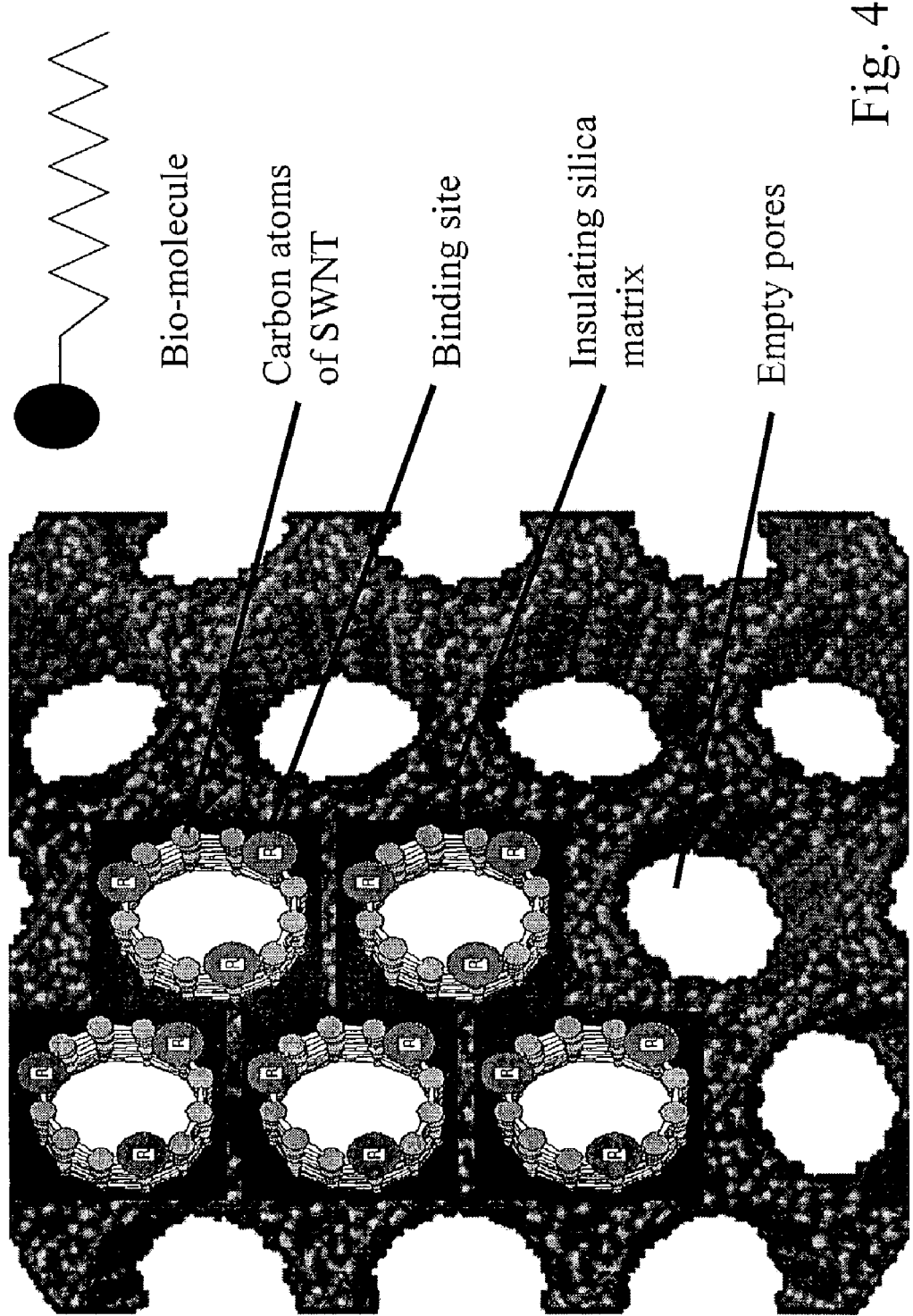
FIG. 4 shows schematically an array of SWNT for application as a chemical sensor.

FIG. 4 shows schematically an MCM-41 catalytic template with pores of uniform diameter arranged in a closely spaced two-dimensional (hexagonal) pattern. As mentioned above, the walls between pores can be as thin as 0.6-0.8 nm for pore diameters of between 1 nm and several ten nm. This allows dense packing of the SWNT. As seen in FIG. 4, several of the pores are each filled with a SWNT, with the black circles schematically depicting individual carbon atoms. The free ends of the SWNT are shown as projecting out from the major surface of the template and being functionalized with receptor sites A (A=biotin) that are adapted to selectively bind with target ligands A' (A'=monoclonal antibiotin). The exemplary ligands and receptors demonstrate a reversible reaction and specificity, for example, over bovine immunoglobulin. The use of MCM nanotube arrays is ideal for this application, because one can create multiple redundant sensors that can be produced to counteract fouling by the biological molecules which are much larger than the tip end of a SWNT, and/or create multiple selectivity for different absorbed receptors. Since the tubes are open-ended and retained in the catalytic template, they are not at risk of being damaged during functionalization.

The presence of molecules at binding sites can, for example, be detected optically. FIGS. 5A-5C show the electronic band structures of a simpler system, namely a SWNT (10,0) which is expected to be metallic (FIG. 5A), a $NO_2$ molecule (FIG. 5B), and the combined SWNT-$NO_2$ system (FIG. 5C). Arrows indicate the occupied states of $NO_2$ molecular orbitals. The optical transition from the uppermost occupied state of the $NO_2$ molecular orbital in the SWNT to the unoccupied higher energy conduction band can be detected.

As mentioned above, the ends of the SWNT can be provided with ohmic contacts. The electrical characteristic of the SWNT can be altered, for example, by attaching a receptor site between contacts, creating a field effect transistor (FET). The FET can be effective in amplifying signals induced by the presence of the target molecules (ligands). In a conventional FET, current flows along a semiconductor pathway called a channel. The ohmic contacts of the SWNT form the source and the drain at the ends of the channel. The presence of the ligand changes the gate voltage and hence the effective electrical diameter of the channel. A small change in gate voltage results in a significant variation in the current from the source to the drain. Nanoscale FET's can be have an increased sensitivity due to the greater surface (gate) to volume (channel) ratio, making single molecule sensitivity possible. These devices are reversible by removing the ligand.

Nanoscale Transistors

Unlike MCM-41 which has substantially parallel one-dimensional pores arranged in a two-dimensional pattern, as depicted in FIG. 4, MCM-48 has a cubic pore system arranged in a three-dimensional interconnected network. As in MCM-41, tetrahedrally coordinated Si can be replaced by metals from the first row of transitional elements, such as Ti, V, Cr, Mn, Fe, Co, and Ni, as well as other metals known in the art., e.g., Al, Zr and Mn. Since pores extending in the MCM-48 framework in different directions can overlap, crossbar switches and Y-junction transistors are feasible. Since the SWNT can be grown in the pores of the MCM-48 catalytic template with controlled physical and electronic properties by employing the template preparation and SWNT growth methods described above, the crossbar switches and Y-junction transistors can also have predictable and selectable electronic transport characteristics.

Figure 6A:
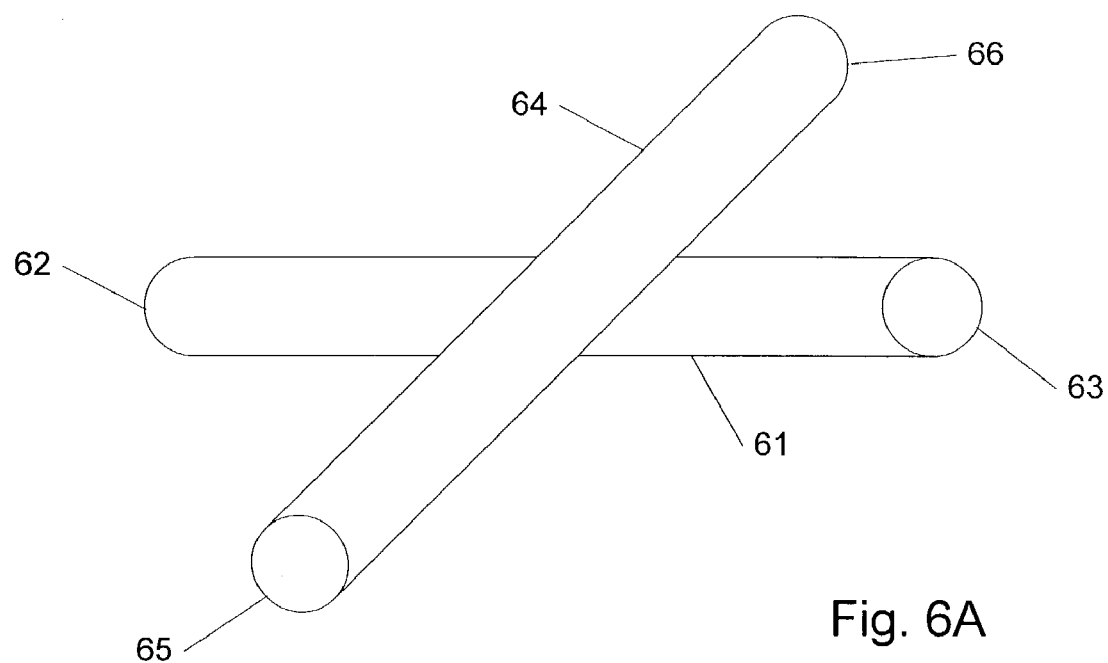
FIG. 6A shows schematically an electronic crossbar switch made of SWNT grown in an interconnected framework (framework omitted)
Figure 6B:
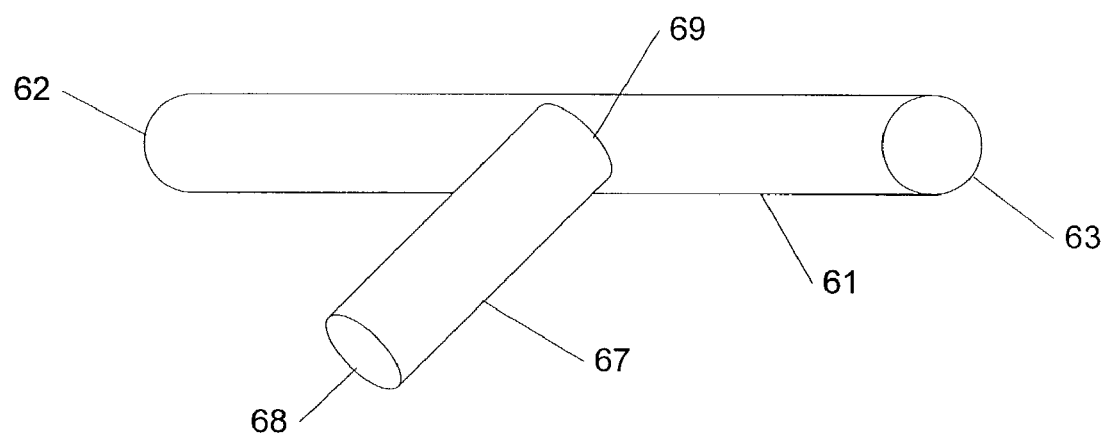
FIG. 6B shows schematically a Y-junction transistor made of SWNT grown in a framework having interconnecting pores (framework omitted).

FIG. 6A shows schematically a three-dimensional configuration of SWNT forming a crossbar switch that can be grown inside a MCM-48 framework. Exemplary SWNT 61 and 64 cross each other so as to make electrical contact. Contacts 62, 63 can be placed at end sections of SWNT 61, and at least one contact 65, 66 can be placed at end sections of SWNT 64. Current can flow between SWNT 61, 64, or current flow along one of the SWNT 61, 64 can be controlled by applying an electric potential to the other SWNT 64, 61, for example, at one of the contacts 62, 62, 65, 66. In another exemplary embodiment depicted in FIG. 6B, the SWNT 67 terminates along SWNT 61, forming a Y-junction transistor similar to an FET. Current flow through SWNT 61 between contacts 62, 63 can be controlled at junction 69 by applying a gate voltage to contact 68 formed on SWNT 67. The carbon nanotube networks formed inside the MCM-48 have proven to be strong enough to survive removal of the framework, for example, by etching in HF. For operation, these devices can hence remain either inside the framework with only the ends of the nanotubes exposed for contact formation, or the devices can be first individually functionalized with contacts and then removed from the framework. It will be understood that the illustrated embodiment of a Y-junction transistor is only exemplary and that entire integrated circuits that include semiconducting SWNT transistors, switches and/or metallic SWNT interconnects can be formed inside the different types of frameworks described above, with the physical and electronic properties of the SWNT determined by the selected pore size of the framework and the wall chemistry. Such integrated circuits can perform functions presently executed in semiconductor devices, for example, computational and logical operations and memory functions.

While the invention has been disclosed in connection with the preferred embodiments shown and described in detail, various modifications and improvements thereon will become readily apparent to those skilled in the art. For example, ordered arrangements of mesoporic pores suitable for the controlled growth of SWNT can also be prepared by magnetically orienting different Fe-doped layer in different directions by polarization in an external magnetic field during the growth phase. If Fe or another magnetic material is incorporated in the SWNT, nano-magnetic junctions can be formed that can be responsive to an externally applied magnetic field or to a magnetic field generated by electric currents flowing through proximate nanotubes. MPMS catalytic templates for nanotube growth can also be prepared as aligned crystals on quartz plates and/or Si wafers. Accordingly, the spirit and scope of the present invention is to be limited only by the following claims.

What is claimed is:

1. A method for producing single-wall carbon nanotubes, comprising:

providing a mesoporous siliceous M41S framework prepared from a mixture of silica comprising in combination colloidal silica and a soluble silica salt and a metal precursor and having a predetermined uniform pore size, wherein metal ions of the precursor are selectively dispersed in silicon cation substitutional sites of the framework, said dispersed metal ions forming the only source of catalytic sites, and flowing a carbon-containing reactant over the framework at a predetermined temperature, thereby producing the single-wall carbon nanotubes with a diameter that correlates with the predetermined pore size.

2. The method of claim 1, wherein flowing the reactant over the framework comprises exposing the framework to the reactant, oxidizing a reaction product formed in the framework, and repeating said exposing and oxidizing for a predetermined number of cycles.

3. The method of claim 1, wherein the M41 is framework includes MCM-41 and MCM-48.

4. The method of claim 1, wherein the predetermined pore size is between 1.5 and 20 mm.

5. The method of claim 1, wherein the predetermined pore size is between 1.5 and 4 nm.

6. The method of claim 1, comprising selecting a concentration of metal salts in the mixture such that metal ions at the catalytic sites produce single-wall carbon nanotubes with predetermined electronic properties that are predominantly metallic.

7. The method of claim 6, wherein the concentration of metal ions at the catalytic sites is above 0.5 wt. %.

8. The method of claim 6, wherein the concentration of metal ions at the catalytic sites is below 0.5 wt. % and preferably below approximately 0.1 wt. %.

9. The method of claim 1, comprising selecting a concentration of metal salts in the mixture such that metal ions at the catalytic sites produce single-wall carbon nanotubes with predetermined electronic properties that are predominantly semiconducting.

10. The method of claim 9, wherein the concentration of metal ions at the catalytic sites is above 0.5 wt. %.

11. The method of claim 9, wherein the concentration of metal ions at the catalytic sites is below 0.5 wt. % and preferably below approximately 0.1 wt. %.

12. The method of claim 1, wherein the selectively dispersed metal ions stabilize by interaction with the framework so as to resist clustering.

13. The method of claim 1, wherein the metal ions are selected from the group consisting of Ti, V, Cr, Mn, Fe, Co, Ni.

14. The method of claim 1, wherein providing a concentration of the metal ions for the mixture does not alter the pore size of the framework.

15. The method of claim 1, wherein the carbon-containing reactant comprises CO.

16. The method of claim 1, wherein the carbon-containing reactant includes a reducing agent.

17. The method of claim 16, wherein the reducing agent comprises at least one of ammonia and hydrogen.

18. The method of claim 1, wherein the carbon-containing reactant comprises acetylene.

19. The method of claim 1, and further comprising exposing the framework to an organic molecule which covalently bonds with the pore wall of the framework.

20. The method of claim 19, and further comprising heating the framework in an inert gas after exposure to the organic molecule.

21. The method of claim 19, wherein the organic molecule comprises a material with a C5 or C6 ring structure.

22. The method of claim 19, wherein the organic molecule comprises phenol, benzoic acid or benzyl chloride.

23. The method of claim 1, and further comprising maintaining a pH value of approximately 11.

24. The method of claim 1, wherein the nanotubes comprise open ends.

25. The method of claim 24, and further including functionalizing the open ends of the nanotubes with a receptor site adapted to selectively bind with a target ligand.

26. The method of claim 25, wherein the target ligand is a chemical selected from the group of inorganic molecules and organic molecules.

27. The method of claim 25, wherein the receptor site is biotin and the target ligand is monoclonal antibiotin.

28. The method of claim 1, comprising selecting a concentration of metal ions for the mixture to provide a dopant in the single-wall nanotubes for controlling an electronic characteristic of the nanotubes.

29. The method of claim 28, wherein the electronic characteristic is one of metallic and semiconducting.

30. A method for producing single-wall carbon nanotubes, comprising:
providing a mesoporous siliceous M41S framework prepared from an aqueous solution containing a mixture of silica and a metal precursor and a surfactant having a predetermined alkyl chain length, said framework having a predetermined uniform pore size correlated with the alkyl chain length, wherein metal ions of the precursor are selectively dispersed in silicon cation substitutional sites of the framework, said dispersed metal ions forming the only source of catalytic sites, and
flowing a carbon-containing reactant over the framework at a predetermined temperature,
thereby producing the single-wall carbon nanotubes with a diameter that correlates with the predetermined pore size.

31. The method of claim 30, wherein the surfactant comprises $C_nH_{2n+1}(CH_3)_3NBr$ with n selected from n =10, 12, 14, and 16.

32. The method of claim 30, further comprising adding an anti-foaming agent to the aqueous solution.

33. The method of claim 30, wherein the source of silicon comprises thixotropic silica.

34. An arrangement of single-wall carbon nanotubes having a narrow diameter distribution, comprising
a framework made of an mesoporous siliceous structure prepared from a mixture of silica, which comprises in combination colloidal silica and a soluble silica salt, and a metal precursor and having a predetermined uniform pore size, wherein metal ions of the precursor are selectively dispersed in substitutional sites of the framework, said dispersed metal ions forming the only source of catalytic sites, and
single-wall carbon nanotubes produced by flowing a carbon-containing reactant over the framework at a predetermined temperature and disposed in the pores of the framework, said single-wall carbon nanotubes having a diameter that correlates with the predetermined pore size.

35. The arrangement of claim 34, wherein the siliceous framework comprises a structure selected from the M41S class of materials.

36. The arrangement of claim 35, wherein the M41S class of materials includes MCM-41 and MCM-48.

37. The arrangement of claim 34, wherein the predetermined pore size is between 1.5 and 20 nm.

38. The arrangement of claim 34, wherein the predetermined pore size is between 1.5 and 4 nm.

39. The arrangement of claim 34, wherein the pores are separated by pore wall having a thickness of less than 1 nm.

40. The arrangement of claim 34, wherein the nanotubes are disposed in the pores and have at least one open end.

41. The arrangement of claim 40, wherein the at least one open end is functionalized with a receptor site adapted to selectively bind with a target ligand.

42. The arrangement of claim 40, wherein the concentration of metal ions for the mixture provides a dopant in the single-wall nanotubes, controlling an electronic characteristic of the nanotubes.

43. A chemical sensor comprising single-wall carbon nanotubes having a narrow diameter distribution, comprising
 a framework made of an mesoporous siliceous structure prepared from a mixture of silica, which comprises in combination colloidal silica and a soluble silica salt, and a metal precursor and having a predetermined uniform pore size, wherein metal ions of the precursor are selectively dispersed in substitutional sites of the framework, said dispersed metal ions forming the only source of the catalytic sites, and
 single-wall carbon nanotubes produced by flowing a carbon-containing reactant over the framework at a predetermined temperature and disposed in the pores of the framework, said single-wall carbon nanotubes having a diameter that correlates with the predetermined pore size, and at least one open end,
 wherein the at least one end is functionalized with a receptor site adapted to selectively bind with a target ligand.

44. The sensor of claim 43, wherein the pores of the framework are separated by pore walls having a thickness of less than 1 nm, and wherein the nanotubes disposed in the pores of the framework form a closely packed arrangement of nanotubes so as to provide a plurality of binding sites with the target ligand.

45. The sensor of claim 43, wherein a presence of the target ligand on the binding site changes an electronic characteristic of the sensor.

46. The sensor of claim 45, wherein the electronic characteristic is an optical response of the sensor.

47. The sensor of claim 45, wherein the electronic characteristic is an electrical response of the sensor.

48. A method for producing single-wall carbon nanotubes, comprising:
 providing a mesoporous siliceous M41S framework prepared from a mixture of silica and a metal precursor and having a predetermined uniform pore size, wherein metal ions of the precursor are selectively dispersed in silicon cation substitutional sites of the framework, said dispersed metal ions forming the only source of catalytic sites,
 exposing the framework to an organic molecule comprising a material selected from a group consisting of phenol, benzoic acid, benzyl chloride and a material with a C5 or C6 ring structure, which bonds with the pore wall of the framework, and
 flowing a carbon-containing reactant over the framework at a predetermined temperature,
 thereby producing the single-wall carbon nanotubes with a diameter that correlates with the predetermined pore size.

49. A method for producing single-wall carbon nanotubes, comprising:
 providing a mesoporous siliceous M41S framework prepared from a mixture of silica and a metal precursor and having a predetermined uniform pore size, wherein metal ions of the precursor are selectively dispersed in silicon cation substitutional sites of the framework, said dispersed metal ions forming the only source of catalytic sites,
 exposing the framework to a carbon-containing reactant at a predetermined temperature,
 oxidizing a reaction product formed in the framework, and
 repeating said exposing and oxidizing for a predetermined number of cycles,
 thereby producing the single-wall carbon nanotubes with a diameter that correlates with the predetermined pore size.

* * * * *

UNITED STATES PATENT AND TRADEMARK OFFICE
CERTIFICATE OF CORRECTION

PATENT NO.         : 7,357,983 B2                                                     Page 1 of 1
APPLICATION NO.    : 10/328857
DATED              : April 15, 2008
INVENTOR(S)        : Pfefferle et al.

It is certified that error appears in the above-identified patent and that said Letters Patent is hereby corrected as shown below:

Col. 1, beginning at line 12, please add the following paragraph:

-- STATEMENT REGARDING FEDERALLY SPONSORED RESEARCH OR DEVELOPMENT

This invention was made with government support under DE-FG02-01ER15183 awarded by Department of Energy. The government has certain rights in the invention. --

Signed and Sealed this
Thirty-first Day of January, 2012

David J. Kappos
*Director of the United States Patent and Trademark Office*